United States Patent
Dawson (10) Patent No.: US 8,966,528 B2
(45) Date of Patent: *Feb. 24, 2015

(54) SYSTEM AND METHOD OF PROVIDING AN INTERACTIVE MENU THROUGH STREAMING VIDEO

(71) Applicant: Sony Corporation, Tokyo (JP)

(72) Inventor: Thomas Patrick Dawson, Escondido, CA (US)

(73) Assignee: Sony Corporation, Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 13/622,602

(22) Filed: Sep. 19, 2012

(65) Prior Publication Data

US 2014/0082669 A1    Mar. 20, 2014

Related U.S. Application Data

(63) Continuation of application No. 12/904,284, filed on Oct. 14, 2010, now Pat. No. 8,347,329.

(51) Int. Cl.
*G06F 3/00* (2006.01)
*G06F 13/00* (2006.01)
*H04N 5/445* (2011.01)

(52) U.S. Cl.
USPC .............. 725/37; 725/39; 715/829; 345/646

(58) Field of Classification Search
USPC ............... 725/37, 39; 715/829; 345/646
See application file for complete search history.

(56) References Cited

U.S. PATENT DOCUMENTS

| | | | | |
|---|---|---|---|---|
| 5,673,401 | A * | 9/1997 | Volk et al. | 725/139 |
| 6,018,372 | A * | 1/2000 | Etheredge | 725/44 |
| 6,317,791 | B1 * | 11/2001 | Cohn et al. | 709/227 |
| 6,642,939 | B1 * | 11/2003 | Vallone et al. | 715/721 |
| 7,600,192 | B1 * | 10/2009 | Hashimoto et al. | 715/802 |
| 2002/0054068 | A1 * | 5/2002 | Ellis et al. | 345/716 |
| 2002/0066101 | A1 * | 5/2002 | Gordon et al. | 725/43 |
| 2002/0078451 | A1 * | 6/2002 | Nishina et al. | 725/43 |
| 2003/0208759 | A1 * | 11/2003 | Gordon et al. | 725/46 |
| 2004/0044724 | A1 * | 3/2004 | Bell et al. | 709/203 |
| 2004/0237108 | A1 * | 11/2004 | Drazin et al. | 725/56 |
| 2006/0202978 | A1 * | 9/2006 | Lee et al. | 345/204 |
| 2007/0006262 | A1 * | 1/2007 | Cleron et al. | 725/42 |
| 2009/0128581 | A1 * | 5/2009 | Brid et al. | 345/646 |
| 2010/0242073 | A1 * | 9/2010 | Gordon et al. | 725/98 |
| 2012/0096496 | A1 * | 4/2012 | Dawson | 725/40 |

* cited by examiner

*Primary Examiner* — Robert Hance
(74) *Attorney, Agent, or Firm* — John L. Rogitz (57) ABSTRACT

A method of providing a menu for video content is disclosed and may include delivering a looping video clip over a first video channel. The looping video clip may be configured to be displayed on a video plane. The method may also include delivering side channel data over a second video channel. The side channel data may include two or more navigable menu elements that may be configured to be displayed on a graphics overlay plane.

19 Claims, 7 Drawing Sheets

SYSTEM AND METHOD OF PROVIDING AN INTERACTIVE MENU THROUGH STREAMING VIDEO

FIELD OF THE INVENTION

Home entertainment systems are widespread. A typical home entertainment system may include a television that is connected to a set top box and a media player, e.g., a digital video disc (DVD) player.

BACKGROUND OF THE INVENTION

The television or the set top box may receive video content from a content provider, e.g., a cable company, a telephone company, a satellite company, etc., and decode the content for viewing. Video content providers have to rely on the graphics capabilities of the receiving platform to show the user interface. As understood herein, however, many consumer electronics devices have minimal graphics capability in order to reduce product costs, and as further understood herein, it is a user interface application on the CE device that draws the menus that allow the customer to make selections that range from what video to view to what the volume should be.

SUMMARY OF THE INVENTION

Present principles recognize that a means to provide a rich user experience on a CE product without including an expensive graphics rendering engine of the type used in game consoles is required. In other words, present principles recognize a need to have menu systems with the same exciting look as is provided by 3D rendering engines without requiring the processing power in the CE device that is normally associated with executing such engines.

Accordingly, a method of providing an interactive menu controlled by the streaming content provider is disclosed and may include delivering one or more looping video clips over a first video channel. The video clips may be configured to be displayed on a video plane. The method may also include delivering side channel data within the same data stream through a data channel or over a second video channel within the same video stream. The side channel data may include two or more looping video clips that represent navigable menu elements that may be configured to be displayed on a graphics overlay plane.

In a particular aspect, the looping video clips are shown in the graphics plane that overlays the video plane. The timing in the looping video clips in the graphics plane matches what is being shown in the video plane underneath. The combined visuals from the video and graphics provides a seamless experience. Further, in this aspect, each of the navigable menu elements may include an unfocused state, a focused state, a selected state, or a combination thereof. The unfocused state may include an appearance of a navigable menu element if the navigable menu element does not have a user focus. The focused state may include an appearance of a navigable menu element if the navigable menu element has a user focus. Moreover, the selected state may include an appearance of a navigable menu element if the navigable menu element is selected by a user.

In this aspect, the side channel data may further include one or more legal directions to which a user may navigate from a navigable menu item, a target menu element for each legal move, a unique identifier describing to which target to move when a legal direction is selected, and an action to be performed if the navigable menu item is selected.

In another aspect, an interactive menu is provided and may include one or more looping video clips that may be configured to be delivered through a side channel and displayed on a graphics plane. The side channel data may include at least two or more navigable menu elements in the form of video clips that may be configured to be displayed on a graphics overlay plane. Included with the side channel data is the information on allowable navigation moves and the action to take when a menu element is selected.

In still another aspect, an audio video display device (AVDD) includes a video display and a processor controlling the video display. The processor accesses instructions on a computer readable storage medium to cause the processor to execute logic. The logic includes presenting a menu made of a set of small video clips on the graphics display plane, with the menu including at least one selector element selectable by a user by means of an input device communicating commands to the processor. An action is precipitated responsive to selection of the selector element. The action can be the selection of another video stream containing menu selection element, start a device application, perform a device function such as volume control, or perform a service function where a service subscribed by the customer is performed such as turning the home alarm system on or off. In example embodiments menu selections are sent to a video provider over the Internet and resultant corresponding commands or video streams are sent in response thereto to the device through the network connection.

In the case of invoking another menu, a different video stream with its own side channel data is received from the video provider. During a transition period in which data pertaining to the next menu is being received, the processor collects the new set of video clips from the side channel while the transition sequence is being shown. The loopback may start prior to the end of the video steam. This allows a small exit sequence to be used. The exit sequence goes to a visual state that can be common to the beginning of all of the transition sequences. Having the exit sequence means that additional video streams showing the transition back to a parent menu in each case is not needed.

BRIEF DESCRIPTION OF THE DRAWINGS

In the figures, like reference numerals refer to like parts throughout the various views unless otherwise indicated.

DETAILED DESCRIPTION OF THE PREFERRED EMBODIMENT

Figure 1:
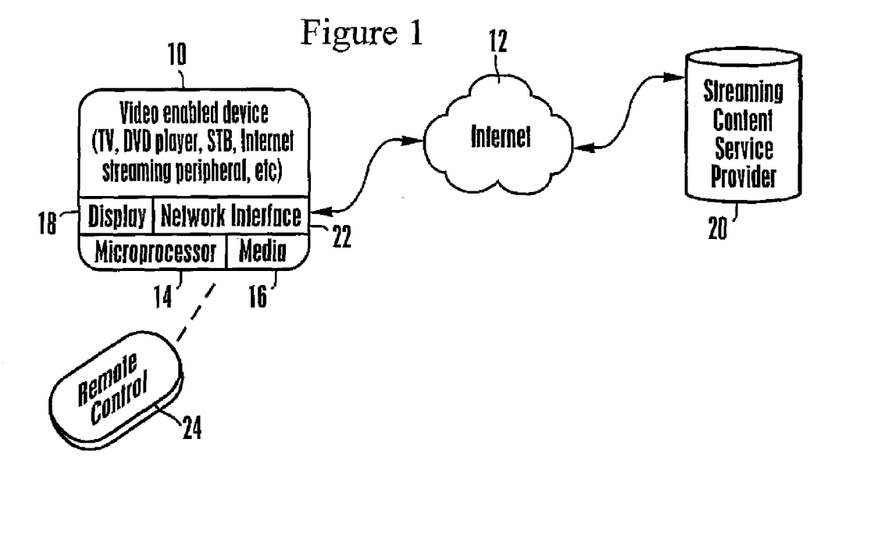
FIG. 1 is a schematic diagram of an example system in accordance with present principles.

Referring initially to FIG. 1, a video-enabled device 10 is shown such as a TV, video disk player, set-top box, consumer electronics (CE) device that can stream video from the Internet 12, etc. The device 10 includes a processor 14 accessing one or more non-transitory computer readable storage media 16 such as disk-based or solid state storage to execute present principles to present in a video display 18 video overlaid with menu graphics that is delivered in the streaming video from a streaming content service provider 20, such as an Internet TV server. The device 10 may also send responses to the provider 20 through the Internet 12. When the content is delivered through the Internet 12, it is received by the device 10 through a network interface 22 such as a wired or wireless modem, wireless telephony transceiver, etc. The device 10 may be controlled by a user entering commands to the processor 14 using a remote commander (RC) 24.

Figure 2:
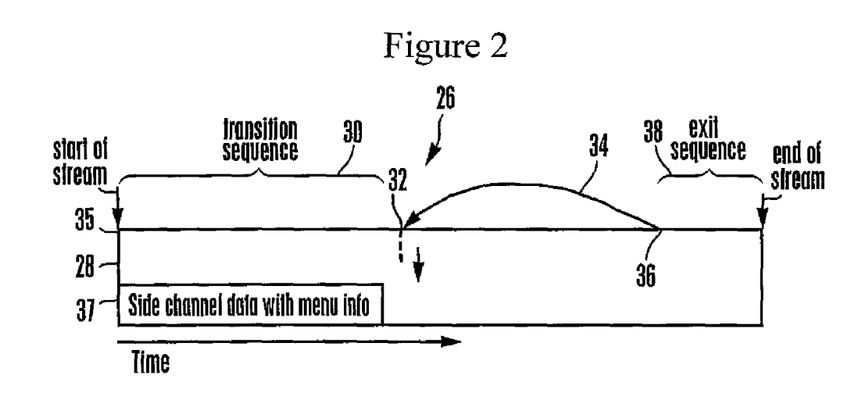
FIG. 2 is a schematic diagram of a video signal.

FIG. 2 shows a timeline, from left to right, of an example video stream 26. As understood herein, a short but potentially noticeable period will elapse between selection of a secondary menu, described further below, and receiving the metadata for the secondary menu in the side channel, also described further below. To avoid a blank screen or a screen in which nothing is happening during this period, a filler video may be presented. In another embodiment, the video stream contains a video representation of the transition to act as filler material while the side channel data is obtained.

As shown, selection of a secondary menu occurs at 28, labeled "start of stream" in the figure. A transition sequence 30 follows as a result during which the menu data for the secondary menu is streamed from the video provider to the TV. During the transition sequence, a filler video representation may be displayed of the first menu evolving into the secondary menu. Without limitation this can be done by showing the first menu dissolving, turning, rotating, fading, or by other video process turning into the secondary menu, although the selector elements of the secondary menu that is presented in the filler video cannot be invoked since the secondary menu metadata defining the functions of the elements is still being streamed to the TV, which streaming is completed at the beginning of the video loop sequence 32 which presents the secondary menu with now-selectable elements to perform logic when selected in accordance with, e.g., blocks 1108-1114 of FIG. 11, described further below.

A looping video clip 34 in a main video channel 35 of the video stream may loop back to the transition completion point 32. A side channel 37 of the video signal contains menu data to be presented in the graphics plane of the display 18 overlaid on the video plane of the display. The loop back of the video may start prior to the end of the video stream at time point 36 to allow a small exit sequence 38 to be used. The exit sequence may go to a visual state that is common to the beginning of all of the transition sequences, if desired. This obviates the need for additional video streams to show the transition back to the parent menu for every transition case. The relatively short video sequence may be played, and replayed, over and over on a video plane until the user performs an action.

Thus, the side channel data in the video stream that is delivered from the provider 20 in FIG. 1 includes overlay information that may be presented in a graphics plane that overlays the video plane. The overlay information contained in the side channel data may appear as small video sequences that include the same color depth and resolution as the video signal in order to appear to be part of the video signal that underlies the overlay information provided by the side channel data.

In a particular aspect, the side channel data may include a logic table for each navigable menu element. Alternatively, the navigation logic can be embedded in each navigable menu element. The side channel data may further include a number of navigable menu elements and each navigable menu element may include meta data and one or more video sequences. The side channel data may also include a video sequence for each navigable menu element that shows what each navigable menu element looks like when that particular navigable menu element does not have the user focus, i.e., the user has not moved a cursor or selector over the navigable menu element.

Moreover, the side channel data may include a video sequence for each navigable menu element that shows what each navigable item looks like when that particular navigable menu element does have the user focus, i.e., the user moves a cursor or selector over the navigable menu element. The side channel data can also include a video sequence for each navigable menu element that shows what each navigable menu element looks like when the user selects a particular navigable menu element, i.e., the user moves a cursor or selector over the navigable menu element and toggles a select button. It can be appreciated that additional video sequences for other actions may also be include in the side channel data.

It can be appreciated that the configuration shown in FIG. 2, and described herein, may be utilized whether the video signal is a streaming video signal from an external source such as a broadcast or Internet source or a pre-packaged signal on media such as a DVD. In the streaming case, a user selection of an element can cause a different video loop to be streamed to the user device. It can be appreciated that selection can also cause other actions, such as a streaming a full length movie. In can also be appreciated that whether the video loops are held on a server or held on media such as a DVD is up to the meta data within the side channel data of the video signal. Hybrid operation may be provided in which video signals and associated side channel data, are derived from both a DVD and an external source.

As the user navigates around the navigable menu elements, the data needed to display each navigable menu element is already present in the side channel data and can be presented, or otherwise displayed, to the user relatively quickly. Since there is no need to switch to a different video loop for basic navigation among navigable menu elements, the user response time is relatively faster and the user experience may be drastically improved.

Figure 3:
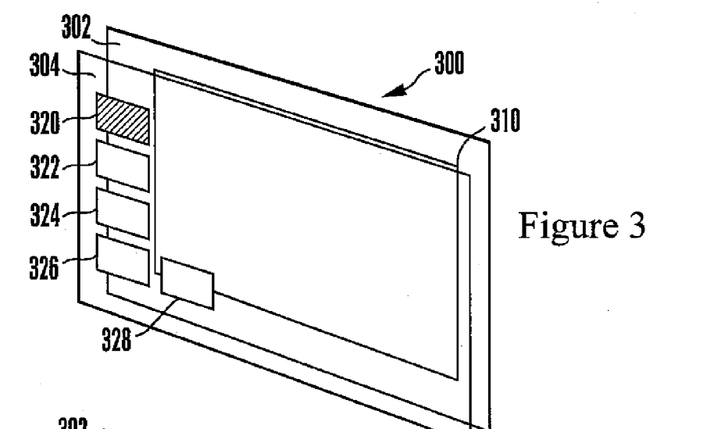
FIG. 3 is a representation of a first aspect of a multi-plane video signal.
Figure 4:
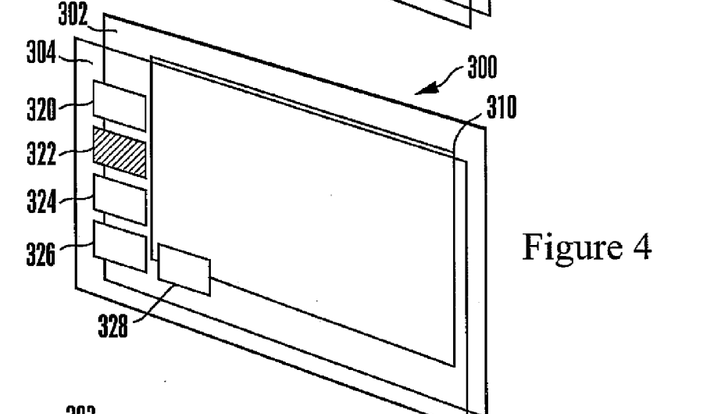
FIG. 4 is a representation of a second aspect of the multi-plane video signal depicted in FIG. 3.
Figure 5:
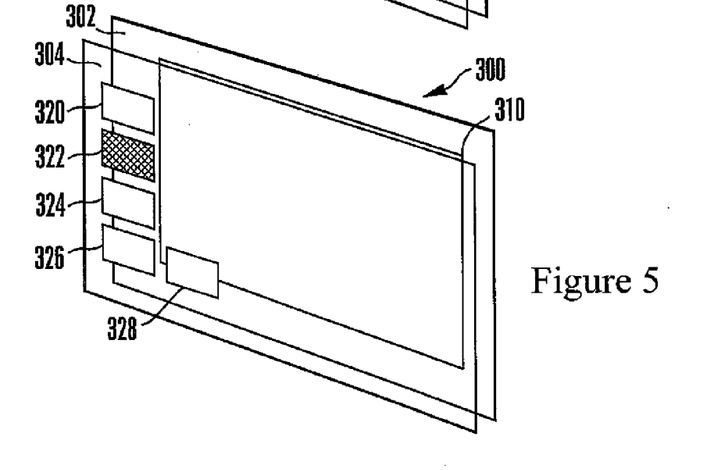
FIG. 5 is a representation of a third aspect of the multi-plane video signal depicted in FIG. 3.

Referring now to FIG. 3 through FIG. 5, a multi-plane video signal is depicted and is generally designated 300. As illustrated, the multi-plane video may include a video plane 302 and a graphics overlay plane 304. The video plane 302 may include video content 310, e.g., an underlying looping video clip. The graphics overlay plane 304 may include a first navigable menu element 320, a second navigable menu element 322, a third navigable menu element 324, a fourth navigable menu element 326, and an Nth navigable menu element 328. The navigable menu elements 320, 322, 324, 326, 328 may appear over the underlying looping video clip. Further, each navigable menu element 320, 322, 324, 326, 328 may include an unfocused state, a focused state, and a selected state.

For each navigable menu element 320, 322, 324, 326, 328, the unfocused state may determine, or dictate, the appearance of each navigable menu element 320, 322, 324, 326, 328 when the navigable menu element 320, 322, 324, 326, 328 does not have the user focus, i.e., the user has not moved a cursor or selector over, or to, the navigable menu element 320, 322, 324, 326, 328. Additionally, for each navigable menu element 320, 322, 324, 326, 328, the focused state may determine, or dictate, the appearance of each navigable menu element 320, 322, 324, 326, 328 when the navigable menu element 320, 322, 324, 326, 328 has the user focus, i.e., the user has moved a cursor or selector over, or to, the navigable menu element 320, 322, 324, 326, 328. For each navigable menu element 320, 322, 324, 326, 328, the selected state may determine, or dictate, the appearance of each navigable menu element 320, 322, 324, 326, 328 when the navigable menu element 320, 322, 324, 326, 328 is selected by a user, i.e., the user has moved a cursor or selector over, or to, the navigable menu element 320, 322, 324, 326, 328 and toggled a select button.

FIG. 3 shows the first navigable menu element 320 in a focused state. The second navigable menu element 322, the third navigable menu element 324, the fourth navigable menu element 326, and the Nth navigable menu element 328 are shown in an unfocused state. FIG. 4 shows the second navigable menu element 322 in a focused state. The first navigable menu element 320, the third navigable menu element 324, the fourth navigable menu element 326, and the Nth navigable menu element 328 are shown in an unfocused state. FIG. 5 shows the second navigable menu element 322 in a selected state. The first navigable menu element 320, the third navigable menu element 324, the fourth navigable menu element 326, and the Nth navigable menu element 328 remain in the unfocused state.

It may be appreciated that in a particular aspect, in lieu of showing a particular navigable menu element 320, 322, 324, 326, 328 in a selected state, the system, e.g., a device, may simply perform the action associated with selecting a particular navigable menu element 320, 322, 324, 326, 328.

In a particular aspect, the navigable menu elements 320, 322, 324, 326, 328 are delivered to the graphics overlay plane via a side channel in the multi-plane video signal 300. The image content of each navigable menu element 320, 322, 324, 326, 328 may be updated, or refreshed, at the same frame rate as the underlying video clip 310. Further, in a particular aspect, one navigable menu element 320, 322, 324, 326, 328 may be in a focused state at a time.

Figure 6:
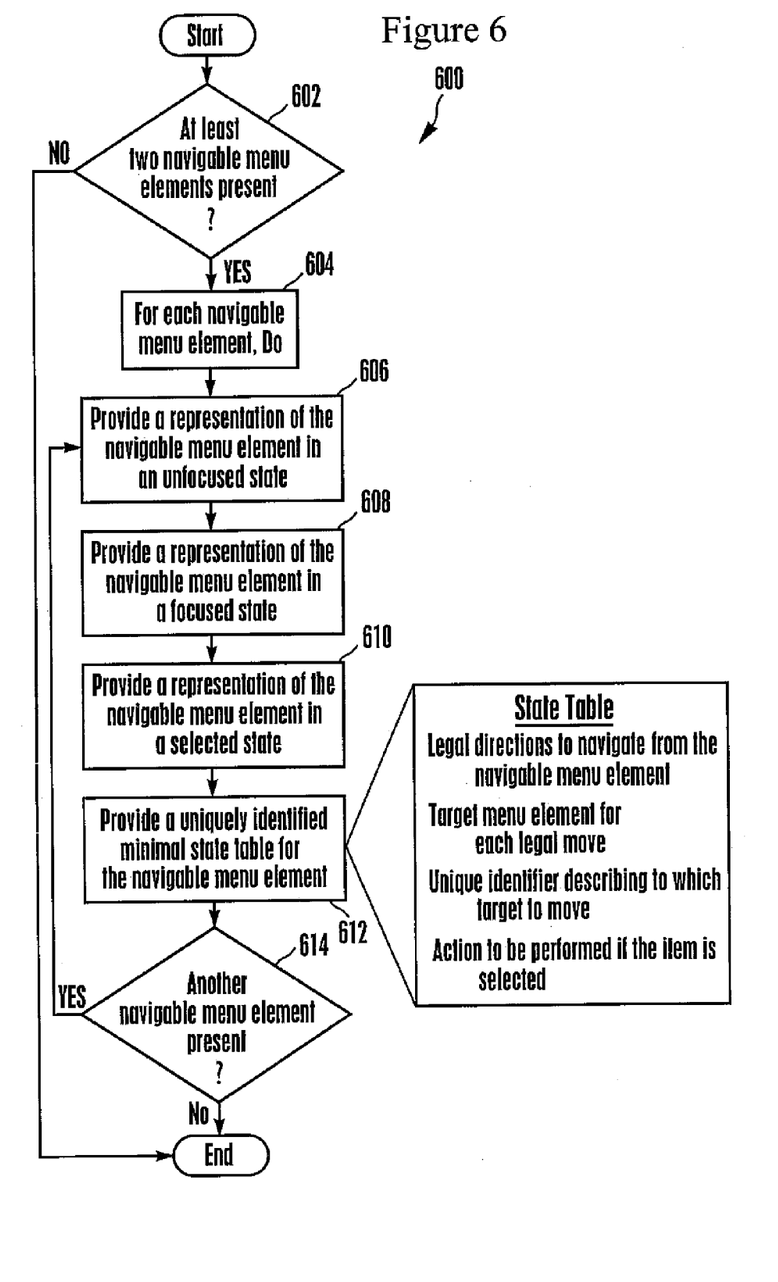
FIG. 6 is a flowchart illustrating a method of establishing navigable menu elements.

FIG. 6 depicts a method, designated 600, of establishing navigable menu elements. Commencing at decision 602, it may be determined whether two or more navigable menu elements are present. If two or more navigable menu elements are not present, the method 600 may end. Otherwise, the method 600 may proceed to block 604 and a do loop may be entered in which the following steps can be performed.

At block 606, a representation of the current navigable menu element in an unfocused state may be provided. At block 608, a representation of the current navigable menu element in a focused state may be provided. Moving to block 610, a representation of the current navigable menu element in a selected state may be provided. Further, at block 612, a uniquely identified minimal state table for the current navigable menu item may be provided.

In a particular aspect, the minimal state table for each navigable menu item may include one or more legal directions to which a user may navigate from the current navigable menu item. These directions may be left, right, up, down, upper left, upper right, lower left, lower right, or any combination thereof. The minimal state table for each navigable menu item may also include a target menu element for each legal move. Further, the minimal state table for each navigable menu item may also include a unique identifier describing to which target to move when a legal direction is selected. The minimal state table may also include an action to be performed if the navigable menu item is selected.

Continuing to decision 614, it may be determine whether another navigable menu element is present. If another navigable menu element is present, the method 600 may return to block 606 and thereafter, the method 600 may continue as described herein. Otherwise, if no other navigable menu item is present, the method 600 may end.

Figure 7:
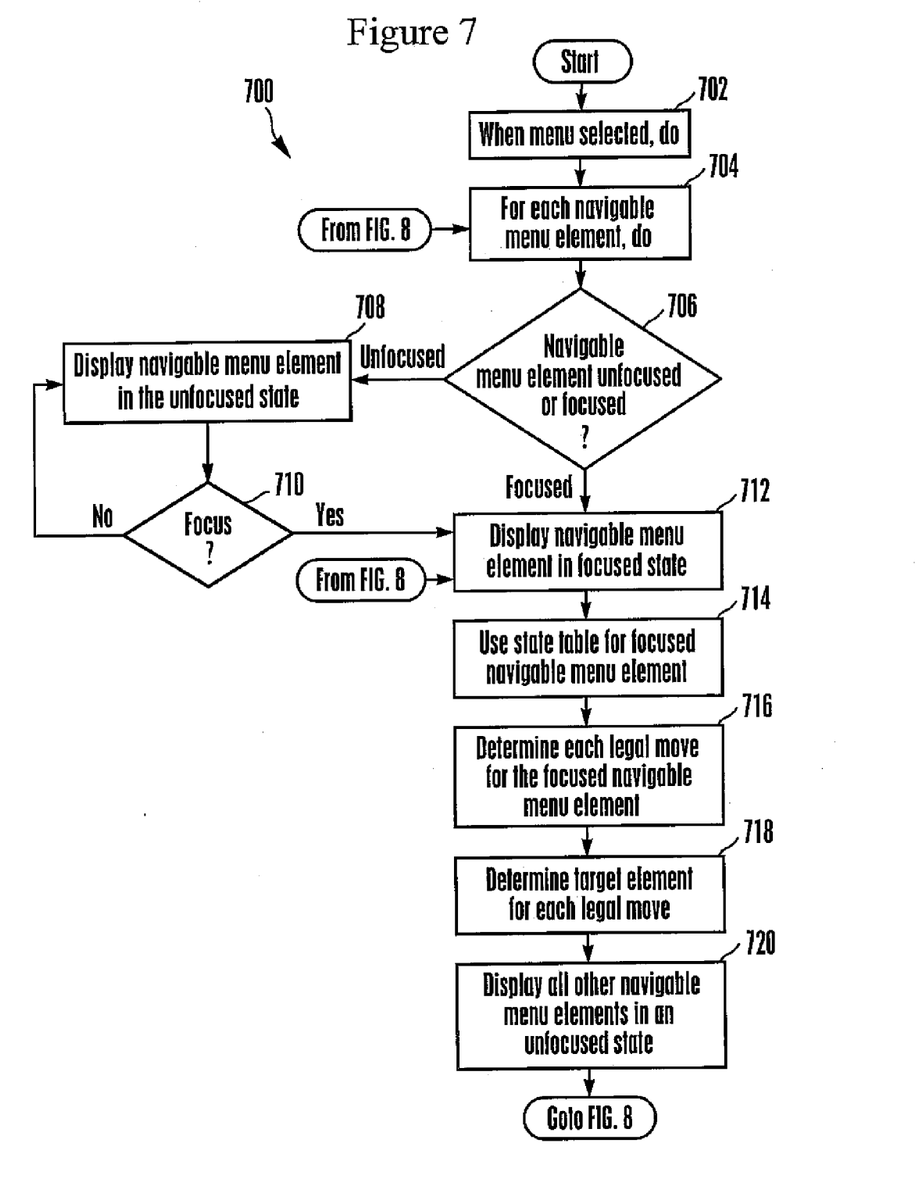
FIG. 7 is a first portion of a flowchart illustrating a method of operating a video content menu.
Figure 8:
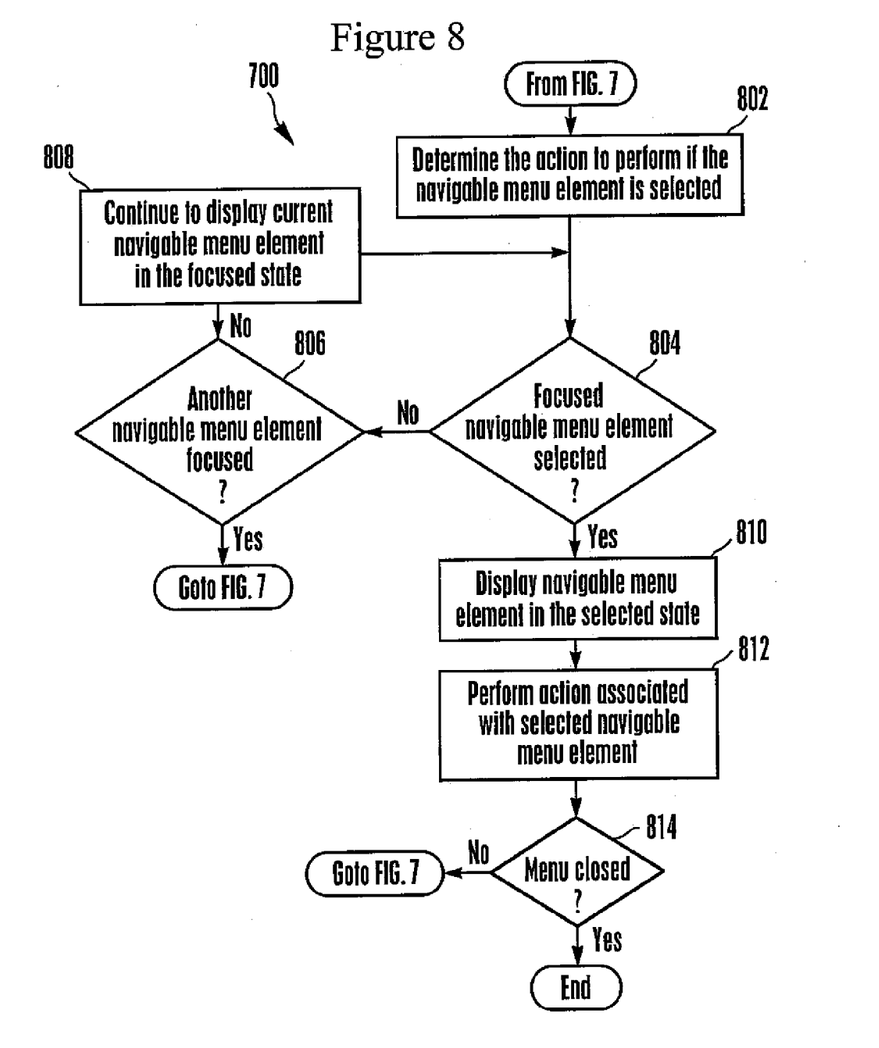
FIG. 8 is a second portion of the flowchart illustrating the method of operating a video content menu.

Referring now to FIG. 7 and FIG. 8, a method of operating a menu is shown and is generally designated 700. Beginning at block 702, a do loop may be entered in which when a menu is selected, the succeeding steps may be performed. At block 704, for each navigable menu element, the following steps may be executed. At decision 706, it may be determined whether the current navigable menu element is unfocused or focused. If the current navigable menu item is unfocused, the method 700 may proceed to block 708 and the current navigable menu item may be displayed in an unfocused state associated with the current navigable menu item.

Moving to decision 710, it may be determined whether the current navigable menu element is focused, i.e., is the current menu element the object of a user's focus. If not, the method 700 may return to bock 708 and the current navigable menu element may remain in the unfocused state. Then, the method 700 may continue as described herein. Returning to decision 710, if the current menu element is focused, the method 700 may proceed to block 712. The method 700 may also proceed to block 712 from decision 706, if the current navigable menu item is focused.

At block 712, the current navigable menu item may be displayed in the focused state. Thereafter, at block 714, a device, e.g., a DVD player or set top box, may use a state table for information related to the focused navigable menu element. Moving to block 716, each legal move for the focused navigable menu element may be determined based on the state table. Further, at block 718, the target navigable menu element for each legal move may be determined based on the state table. At block 720, all other navigable menu elements may be displayed in an unfocused state. Then, the method 700 may proceed to block 802 of FIG. 8.

At block 802 of FIG. 8, the action to perform if the current focused navigable menu element is selected may be determined. The action may include: play, set-up, select scene, select chapter, resume play, main menu, play audio commentary, special features, extras, languages, subtitles, audio, or any combination thereof.

Moving to decision 804, it may be determined whether the current focused navigable menu element is selected by a user. If not, the method 700 may move to decision 806 and it may be determined whether another navigable menu item is focused. If another navigable menu item is focused, the method 700 may return to block 712 of FIG. 7. Then, the method 700 may continue as described herein.

At decision 806, if another navigable menu item is not focused and the current navigable menu item remains focused, the method 700 may move to block 808 and the current navigable menu element may continue to be displayed in the focused state. Thereafter, the method 700 may return to decision 804 and continue as described herein.

Returning to decision 804, if the focused navigable menu item is selected, the method 700 may proceed to block 810 and the navigable menu element may be displayed in the selected state. Next, at block 812, the action associated with the selected navigable menu element may be performed. Continuing to decision 814, it may be determined whether the menu is closed. If the menu is closed, the method 700 may end. Otherwise, if the menu remains open, the method 700 may return to block 704 of FIG. 7 and the method 700 may continue as described herein.

Figure 9:
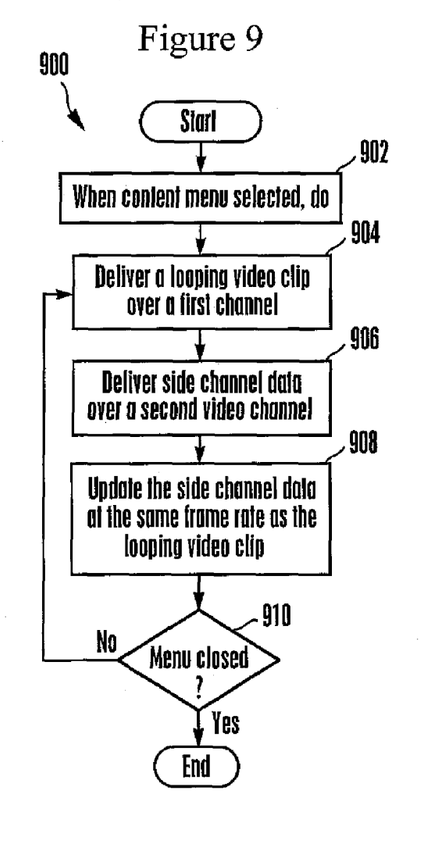
FIG. 9 is a flowchart illustrating a method of delivering a video content menu.

FIG. 9 depicts a method of delivering a video content menu, generally designated 900. The video content menu may be delivered from a DVD, a streaming video content source, or a combination thereof. Beginning at block 902, a do loop may be entered in which when a video content menu is selected, the following steps may be performed. At block 904, a video signal may be delivered over a first video channel. At block 906, side channel data may be delivered over a second video channel.

In a particular aspect, the side channel data may include a number of navigable menu elements and each navigable menu element may include meta data and one or more video sequences. The side channel data may also include a video sequence for each navigable menu element that shows what each navigable menu element looks like when that particular navigable menu element does not have the user focus, i.e., the user has not moved a cursor or selector over the navigable menu element.

Further, the side channel data may include a video sequence for each navigable menu element that shows what each navigable item looks like when that particular navigable menu element does have the user focus, i.e., the user moves a cursor or selector over the navigable menu element. The side channel data can also include a video sequence for each navigable menu element that shows what each navigable menu element looks like when the user selects a particular navigable menu element, i.e., the user moves a cursor or selector over the navigable menu element and toggles a select button. It can be appreciated that additional video sequences for other actions may also be include in the side channel data.

Also, in this aspect, the side channel data may include one or more legal directions to which a user may navigate from each navigable menu item. These directions may be left, right, up, down, upper left, upper right, lower left, lower right, or any combination thereof. Moreover, the side channel data may include a target menu element for each legal move from a navigable menu element. The side channel data may include a unique identifier that describes which target menu element to move to when a legal direction is selected. The side channel data may also include an action to be performed if a particular navigable menu item is selected.

Returning to the description of FIG. 9, at block 908, the side channel data may be updated at the same frame rate as the video signal. Moving to decision 910, it may be determined whether the menu is closed. If the menu is not closed, the method 900 may return to block 904 and the method 900 may continue as described herein. If the menu is closed, the method 900 may end.

Figure 10:
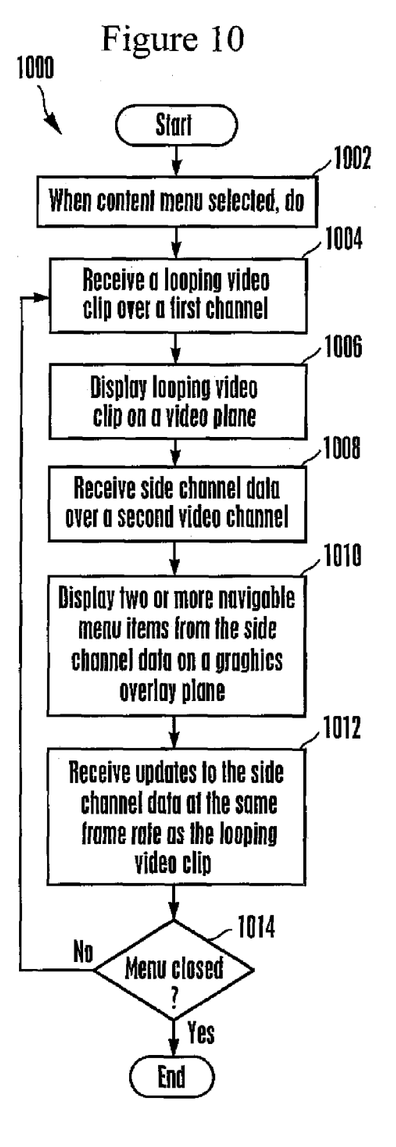
FIG. 10 is a flowchart illustrating a method of receiving and displaying a video content menu.

FIG. 10 illustrates a method of receiving a video content menu. The method is generally designated 1000. Commencing at block 1002, a do loop may be entered in which when a video content menu is selected, the following steps may be performed. At block 1004, a looping video clip may be received over a first video channel. The looping video content may be received from a DVD, a streaming video content source, or a combination thereof. At block 1006, the looping video clip may be displayed on a video plane.

Moving to block 1008, side channel data may be received over a second video channel. The side channel data may be received from a DVD, a streaming video content source, or a combination thereof. Further, the side channel data may include a number of navigable menu elements and each navigable menu element may include meta data and one or more video sequences. The side channel data may also include a video sequence for each navigable menu element that shows what each navigable menu element looks like when that particular navigable menu element does not have the user focus, i.e., the user has not moved a cursor or selector over the navigable menu element.

Further, the side channel data may include a video sequence for each navigable menu element that shows what each navigable item looks like when that particular navigable menu element does have the user focus, i.e., the user moves a cursor or selector over the navigable menu element. The side channel data can also include a video sequence for each navigable menu element that shows what each navigable menu element looks like when the user selects a particular navigable menu element, i.e., the user moves a cursor or selector over the navigable menu element and toggles a select button. It can be appreciated that additional video sequences for other actions may also be include in the side channel data.

Also, in this aspect, the side channel data may include one or more legal directions to which a user may navigate from each navigable menu item. These directions may be left, right, up, down, upper left, upper right, lower left, lower right, or any combination thereof. Moreover, the side channel data may include a target menu element for each legal move from a navigable menu element. The side channel data may include a unique identifier that describes which target menu element to move to when a legal direction is selected. The side channel data may also include an action to be performed if a particular navigable menu item is selected.

Returning to the description of FIG. 10, at block 1010, the side channel data, e.g., the navigable menu elements therein, may be displayed on a graphics overlay plane according to the side channel data. It may be appreciated that the graphics overlay plane overlays the video plane and as such, the navigable menu elements overly the looping video clip. At block 1012, updates to the side channel data may be received. The updates may be received at the same frame rate as any updates to the looping video clip.

Moving to decision 1014, it may be determined whether the menu is closed. If the menu is not closed, the method 1000 may return to block 1004 and the method 1000 may continue as described herein. If the menu is closed, the method 1000 may end.

Figure 11:
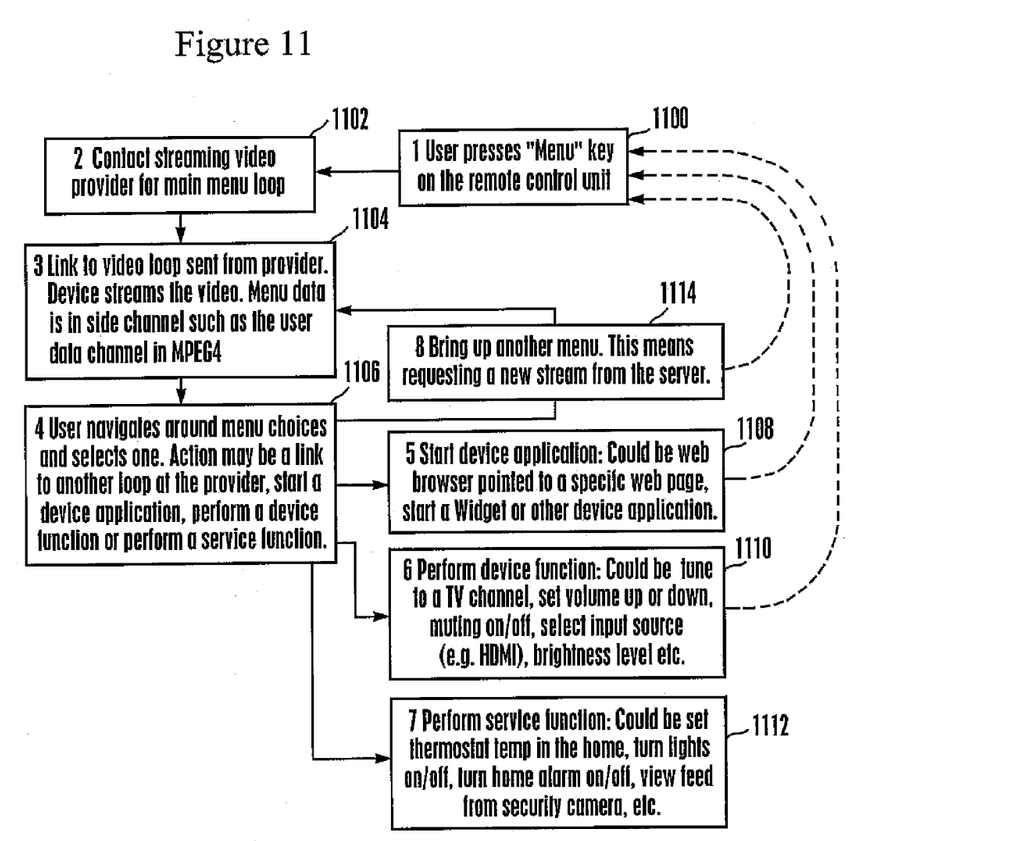
FIG. 11 is a flow chart of additional logic in accordance with present principles.

FIG. 11 illustrates logic in which menu data may be conveyed in a side channel of a video stream and as alternatives signals to facilitate starting device applications, performing device functions, and performing service functions. Commencing at block 1100 a user presses a menu key on the RC 24. At block 1102 the display device receives the "menu" command and responsive to the "menu" command establishes communication with a streaming video provider, e.g., a predetermined Internet server, for a main menu loop. The display device presents the main menu loop at block 1104 upon receipt thereof. As indicated in FIG. 11, the video in the stream is presented on the display and the menu data controlling the functions of selector elements of the menu is received in a side channel of the video stream, e.g., a user data channel in MPEG4.

Block 1106 indicates that a user can use the RC 24 to navigate around the menu presented on the display and select a selector element thereof. Depending on the function of the selector element, the action that is precipitated by its selection may be to link to another menu loop sent from the video provider, starts a device application, perform a device function, or perform a service function. In such instances, menu selections are uploaded to the video provider and resultant corresponding device/service commands are downloaded in response to the TV, which conveys the commands to the appropriate device to execute the commands (or executes the commands itself when appropriate).

With more particularity, assume the user has selected a menu element that starts a device application. In such a case the logic flows to block 1108 to start the application, such as a Web browser, associated with the selected menu element. Or, a widget or other device application may be started.

Next assume that the user has selected a menu element that performs a device function. In such a case the logic flows from block 1106 to block 1110 to perform the device function associated with the selected menu element. By way of illustration only, the device function may be to tune to a particular TV channel, adjust TV volume, turn audio muting on and off, select an input source for the TV such as a high definition multimedia interface (HDMI)-compliant disk player, adjust video brightness or other display setting, and so on.

Next assume that the user has selected a menu element that performs a service function. In such a case the logic flows from block 1106 to block 1112 to perform the service function associated with the selected menu element. By way of illustration only, the service function may be to set a thermostat temperature in the home by means of sending an appropriate signal to an environment controller communicating with the TV, turn lights in the home on and off by sending an appropriate signal to a lighting controller communicating with the TV, enable and disable an alarm in the home by sending an appropriate signal to an alarm controller communicating with the TV, cause a video feed from a home security camera to be presented on the TV, etc.

Yet again, assume the user has selected a menu element that invokes a secondary menu. In this case, the logic flows from block 1106 to block 1114 to request that the video provider stream the new secondary menu to the TV for presentation thereof.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a media device. The media device may be a DVD player, an MPEG device, a mobile telephone device, a portable digital assistant device, a smartbook computing device, a netbook computing device, a laptop computing device, a desktop computing device, or a combination thereof. Also, the various method steps may be combined in any order in order to create new methods.

With the configuration described herein, the systems and methods herein may be used to provide a video content menu. The video content menu may overlay looping video content and may appear as a seamless part of an overall presentation that includes the looping video content in the background. The system and methods herein may allow relatively high speed navigation for the user while retaining studio quality graphics and enhancing the user experience. In a particular aspect, a three dimensional (3D) graphics engine may not be required. In lieu thereof, a 2D graphics engine, e.g., installed within a set top box, a DVD player, a television, an audio/video receiver, or a combination thereof, may update the navigable menu elements while providing a sufficient number of central processing unit (CPU) cycles to perform one or more state table operations.

In one or more exemplary aspects, the functions described may be implemented in hardware, software, firmware, or any combination thereof. If implemented in software, the functions may be stored on or transmitted over as one or more instructions or code on a computer program product such as a machine readable medium, i.e., a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of providing a menu for video content, the method comprising:
   delivering a video signal over a video stream, wherein the video signal is configured to be displayed on a video plane;
   delivering data over the video stream, wherein the data comprises two or more navigable menu elements configured to be displayed on a graphics plane overlaid on the video plane;
   while the video stream is being delivered, presenting a transition sequence during which the data is also streamed; and
   during the transition sequence, displaying a representation including at least one selector element associated with the data, the at least one selector element presented in the representation not being invokable until secondary menu metadata defining at least one function of the at least one selector element of the secondary menu is received.

2. The method of claim 1, wherein the graphics overlay plane overlays the video plane and the two or more navigable menu elements overly the video signal.

3. The method of claim 2, wherein each of the navigable menu elements has an unfocused state, a focused state, a selected state.

4. The method of claim 3, wherein the unfocused state comprises an appearance of a navigable menu element if the navigable menu element does not have a user focus.

5. The method of claim 3, wherein the focused state comprises an appearance of a navigable menu element if the navigable menu element has a user focus.

6. The method of claim 3, wherein the selected state comprises an appearance of a navigable menu element if the navigable menu element is selected by a user.

7. The method of claim 1, wherein the data further comprises one or more legal directions to which a user may navigate from a navigable menu item; a target menu element for each legal move; a unique identifier describing to which target to move when a legal direction is selected; and an action to be performed if the navigable menu item is selected.

8. A device, comprising:
  at least one processor; and
  at least one computer readable storage medium with instructions executable by the processor to render a menu on a video display, the instructions when executed by the processor causing the processor to:
  present a looping video clip delivered on a first video channel and displayed on a video plane; and
  receive side channel data on a second video channel, wherein the side channel data comprises at least two or more navigable menu elements displayed on a graphics overlay plane, the side channel also carrying data to define how a menu element is to appear when the menu element is not in a focused state and how the menu element is to appear responsive to a selection of the menu element, the instructions when executed by the processor configuring the processor to present at least one menu element according to the data received from the side channel;
  while a video stream is being delivered, presenting a transition sequence during which the side channel data is also streamed; and
  during the transition sequence, displaying a representation including at least one selector element associated with the side channel data, the at least one selector element presented in the representation not being invokable until secondary menu metadata defining at least one function of the at least one selector element of the secondary menu is received.

9. The device of claim 8, wherein the instructions when executed by the processor configure the processor to present a navigable menu element not in the focused state using an appearance of the navigable menu element if the navigable menu element does not have a user focus.

10. The device of claim 8, wherein the instructions when executed by the processor configure the processor to present a navigable menu element in a focused state using an appearance of a navigable menu element if the navigable menu element has a user focus.

11. The device of claim 8, wherein a selected state comprises an appearance of a navigable menu element if the navigable menu element is selected by a user.

12. The device of claim 8, wherein the side channel data further comprises one or more legal directions to which a user may navigate from a navigable menu item; a target menu element for each legal move; a unique identifier describing to which target to move when a legal direction is selected; and an action to be performed if the navigable menu item is selected.

13. A The device of claim 8, wherein the side channel data is updated at the same frame rate as the looping video clip.

14. A display device (DD), comprising:
  at least one computer readable storage medium having instructions executable by at least one processor;
  at least one processor configured for accessing the instructions to configure the processor for:
  presenting a menu on a display, the menu including at least one selector element selectable by a user by means of an input device communicating commands to the processor to activate an action,
  responsive to receiving a video stream, presenting a transition sequence during which menu data for a menu is streamed to the DD,
  during the transition sequence, displaying a representation including at least one selector element, the at least one selector element presented in the representation not being invokable until secondary menu metadata defining at least one function of the at least one selector element of the secondary menu is received.

15. The DD of claim 14, wherein the instructions when executed by the processor configure the processor to upload menu selections to a video provider and download resultant corresponding commands or secondary menu in response thereto.

16. The DD of claim 14, wherein the action is a start a device application.

17. The DD of claim 14, wherein the action is perform a device function or perform a service function.

18. The DD of claim 14, wherein the menu is a first menu and the action is to invoke a secondary menu, data pertaining to the secondary menu being received from the video provider.

19. The DD of claim 18, wherein the instructions when executed by the processor configure the processor to, during a transition period in which data pertaining to the secondary menu is being received, present on the display a filler video showing the first menu evolving into the secondary menu.

* * * * *